(12) United States Patent
Gu et al.

(10) Patent No.: US 7,865,479 B2
(45) Date of Patent: Jan. 4, 2011

(54) UPDATING COMPRESSED READ-ONLY MEMORY FILE SYSTEM (CRAMFS) IMAGES

(75) Inventors: Jinsheng Gu, Sunnyvale, CA (US); Premjith Manapetty, Sunnyvale, CA (US)

(73) Assignee: Innopath Software, Inc., Sunnyvale, CA (US)

( * ) Notice: Subject to any disclaimer, the term of this patent is extended or adjusted under 35 U.S.C. 154(b) by 821 days.

(21) Appl. No.: 11/269,463

(22) Filed: Nov. 8, 2005

(65) Prior Publication Data

US 2006/0174300 A1    Aug. 3, 2006

Related U.S. Application Data

(60) Provisional application No. 60/626,252, filed on Nov. 8, 2004, provisional application No. 60/626,292, filed on Nov. 8, 2004, provisional application No. 60/626,293, filed on Nov. 8, 2004.

(51) Int. Cl.
*G06F 7/00* (2006.01)
*G06F 17/00* (2006.01)

(52) U.S. Cl. ............... 707/693; 707/824; 717/168
(58) Field of Classification Search ............ 707/3, 707/201–209, 693, 821, 822, 824; 717/168
See application file for complete search history.

(56) References Cited

U.S. PATENT DOCUMENTS

| | | |
|---|---|---|
| 5,274,805 A | 12/1993 | Ferguson et al. |
| 5,832,520 A | 11/1998 | Miller |
| 6,018,747 A | 1/2000 | Burns et al. |
| 6,671,703 B2 * | 12/2003 | Thompson et al. ......... 707/202 |
| 6,988,182 B2 * | 1/2006 | Teachman et al. ............ 712/37 |
| 7,079,051 B2 * | 7/2006 | Storer et al. ................. 341/51 |

(Continued)

FOREIGN PATENT DOCUMENTS

WO    WO 03025742    3/2003

OTHER PUBLICATIONS

Heterogeneous Hardware-Software System Partitioning using Extended Directed Acyclic Graph, Matthew Jin and Gul N. Khan, 16th International Conference on Parallel and Distributed Systems, Aug. 2003 p. 181-186.*

(Continued)

*Primary Examiner*—James Trujillo
*Assistant Examiner*—Jeffrey Burke
(74) *Attorney, Agent, or Firm*—Gregory & Martensen LLP

(57) ABSTRACT

Systems and methods for CRAMFS file system differencing and updating are provided that include portion-level differencing and block-level updating of blocks of an original image. The differencing and updating split CRAMFS images into portions using CRAMFS file system structure information and block information and perform dependency analysis using hint/list files from the CRAMFS split module. A delta file is generated for each portion (portion-level differencing) of the new CRAMFS image; the delta file includes information of differences between the portion of the new CRAMFS image and the portion of the original CRAMFS image to which the new CRAMFS image portion corresponds. The delta files are transferred to a device where the device target CRAMFS image is updated block-by-block using information of the delta files. The update reconstructs all portions of the new CRAMFS image in a block in host device RAM and writes the reconstructed block into host device ROM.

51 Claims, 9 Drawing Sheets

U.S. PATENT DOCUMENTS

| | | | |
|---|---|---|---|
| 7,089,270 B2 * | 8/2006 | Ren et al. | 707/203 |
| 7,117,204 B2 * | 10/2006 | Gilfix et al. | 1/1 |
| 7,287,068 B1 | 10/2007 | Erikkson et al. | |
| 7,343,443 B1 * | 3/2008 | Yang | 711/5 |
| 7,529,779 B2 * | 5/2009 | Herle et al. | 1/1 |
| 2002/0065799 A1 | 5/2002 | West et al. | |
| 2003/0023964 A1 * | 1/2003 | Rajaram et al. | 717/172 |
| 2003/0182414 A1 | 9/2003 | O'Neil | |
| 2003/0212712 A1 * | 11/2003 | Gu et al. | 707/200 |
| 2004/0062130 A1 * | 4/2004 | Chiang | 365/230.03 |
| 2004/0098420 A1 | 5/2004 | Peng | |
| 2004/0098427 A1 | 5/2004 | Peng | |
| 2004/0243992 A1 * | 12/2004 | Gustafson et al. | 717/168 |
| 2004/0250245 A1 * | 12/2004 | Rao et al. | 717/168 |
| 2005/0010576 A1 * | 1/2005 | Ren et al. | 707/100 |
| 2005/0021572 A1 | 1/2005 | Ren et al. | |
| 2005/0132179 A1 | 6/2005 | Glaum et al. | |
| 2005/0281469 A1 * | 12/2005 | Anderson et al. | 382/232 |
| 2006/0026590 A1 * | 2/2006 | Berenberg et al. | 717/175 |
| 2006/0075284 A1 * | 4/2006 | Skan | 714/5 |
| 2006/0190939 A1 * | 8/2006 | Chen et al. | 717/168 |
| 2007/0299886 A1 | 12/2007 | Novak | |

OTHER PUBLICATIONS

Advanced Bash-Scripting Guide, Chapter 12, p. 1-17, published Jul. 26, 2003, from www.archive.org.*

Randal Burns and Darrell D. Long, In-Place Reconstruction of Delta Compression Files, PODC 1998.*

PCT/US05/40388 Form PCT/ISA/220, "PCT Notification of Transmittal of The International Search Report and the Written Opinion of the International Searching Authority, or the Declaration," 1 pg.

PCT/US05/40388 Form PCT/ISA/210, "PCT International Search Report," 2 pgs.

PCT/US05/40388 Form PCT/ISA/237, "PCT Written Opinion of the International Searching Authority," 8 pgs.

PCT/US05/40322 Form PCT/ISA/220, "PCT Notification of Transmittal of The International Search Report and the Written Opinion of the International Searching Authority, or the Declaration," 1 pg.

PCT/US05/40322 Form PCT/ISA/210, "PCT International Search Report," 4 pgs.

PCT/US05/40322 Form PCT/ISA/237, "PCT Written Opinion of the International Searching Authority," 8 pgs.

PCT/US05/40312 Form PCT/ISA/220, "PCT Notification of Transmittal of The International Search Report and the Written Opinion of the International Searching Authority, or the Declaration," 1 pg.

PCT/US05/40312 Form PCT/ISA/210, "PCT International Search Report," 3 pgs.

PCT/US05/40312 Form PCT/ISA/237, "PCT Written Opinion of the International Searching Authority," 11 pgs.

Burns et al., In-Place Reconstruction of Version Differences, IEEE Transactions on Knowledge and Data Engineering, vol. 15, No. 4, Jul./Aug. 2003, the whole document, Especially 973-976.

Rasch et al., "In-Place Rsync: File Synchronization for Mobile and Wireless Devices", Proceedings of the Freenix Track: 2003 Usenix Annual Technical Conference, Jun. 9, 2003, the whole document, especially p. 94.

* cited by examiner

UPDATING COMPRESSED READ-ONLY MEMORY FILE SYSTEM (CRAMFS) IMAGES

RELATED APPLICATION

This application claims the benefit of U.S. patent application Ser. Nos. 60/626,252, 60/626,292, and 60/626,293, all filed Nov. 8, 2004. This application is related to U.S. patent application Ser. No. 11/269,274 and 11/269,277, both filed Nov. 8, 2005.

TECHNICAL FIELD

The disclosed embodiments relate to updating static file system images using difference files and more particularly updating compressed read-only memory file system (CRAMFS) format images.

BACKGROUND

Software running on a processor, microprocessor, and/or processing unit to provide certain functionality often changes over time and also increases in complexity. The changes can result from the need to correct bugs, or errors, in the software files, adapt to evolving technologies, or add new features, to name a few. In particular, software hosted on mobile processing devices, for example mobile wireless devices, often includes numerous software bugs that require correction. Software includes one or more computer programs, algorithms, files, and/or code pertaining to operation of the host device. Software can be divided into smaller units that are referred to as modules or components.

Portable processor-based devices like mobile processing devices typically include a real-time operating system (RTOS) in which all software components of the device are linked as a single large executable image. Further, file system support has become common recently due to the availability of compact storage and more demanding functionalities in these mobile wireless devices. In addition, the single large image needs to be preloaded, or embedded, into the device using a slow communication link like a radio, infrared, or serial link.

Obstacles to updating the software of mobile processing devices include the time, bandwidth, and cost associated with delivering the updated file to the device, as well as limited resources of the device available for use in updating new files once received. As one example, static file system images are required to be updated in-place (e.g., in read-only memory (ROM)) because of resource limitations (e.g., limitations relating to RAM, ROM, time for downloading the image, power consumption, etc) of the host device. Consequently, there is a need for generating difference files that are sized appropriately for efficient transfer to host devices and for use in updating software of resource-limited devices.

INCORPORATION BY REFERENCE

Each publication, patent, and/or patent application mentioned in this specification is herein incorporated by reference in its entirety to the same extent as if each individual publication and/or patent application was specifically and individually indicated to be incorporated by reference.

Figure 1:
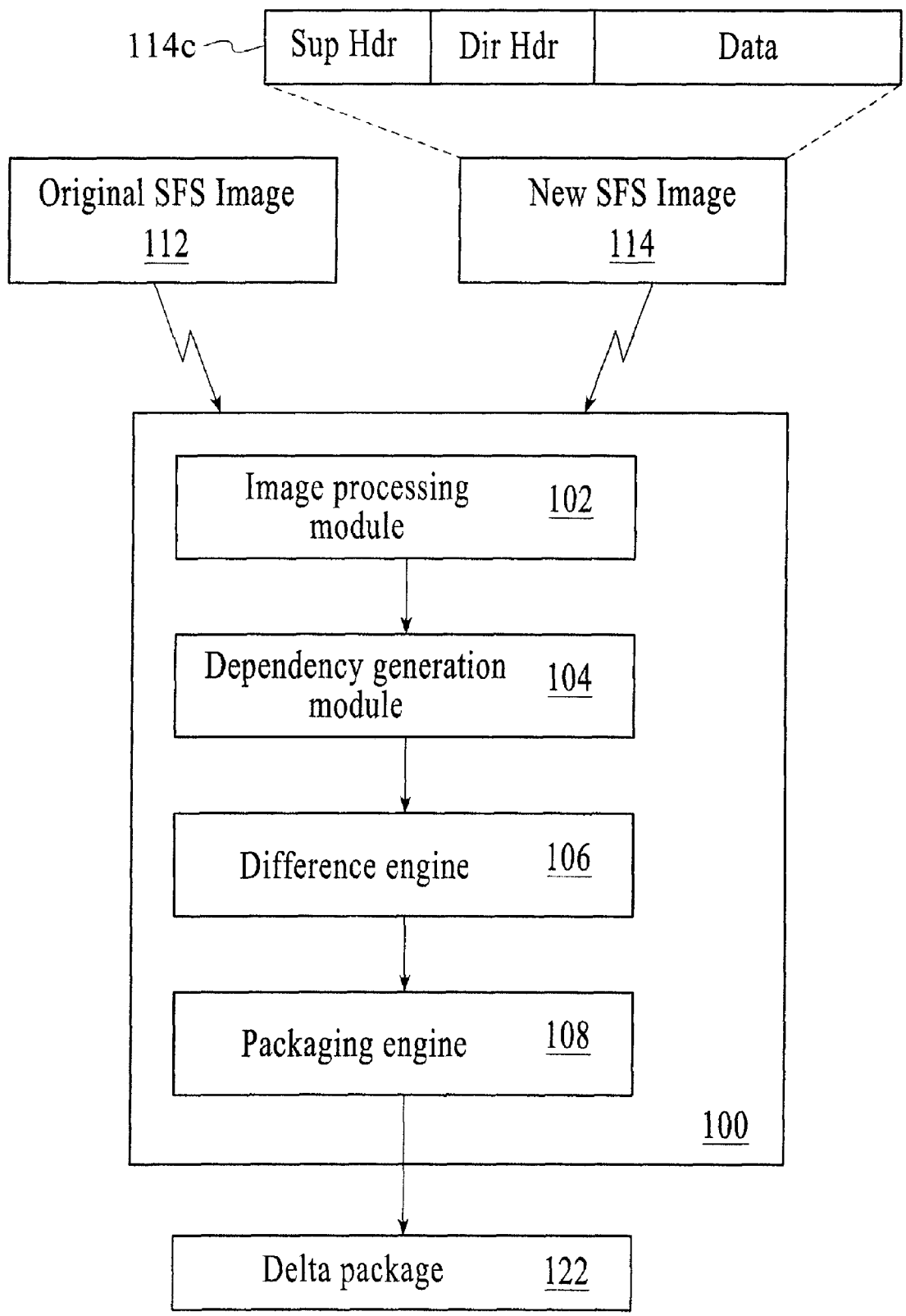
FIG. 1 is a block diagram of a static file system (SFS) differencing system, under an embodiment.

In the drawings, the same reference numbers identify identical or substantially similar elements or acts. To easily identify the discussion of any particular element or act, the most significant digit or digits in a reference number refer to the Figure number in which that element is first introduced (e.g., element 100 is first introduced and discussed with respect to FIG. 1).

DETAILED DESCRIPTION

Systems and methods are provided for static file system (SFS) differencing and updating. The systems and methods for SFS differencing and updating include portion-level differencing and block-level updating of update units of an original image (referred to as device blocks or blocks) as described below. The differencing and updating of an embodiment splits SFS images into a series of portions based on block information and the SFS image structure. A delta file is generated for each portion (portion-level differencing) of the new SFS image, and the delta file includes information of differences between the portion of the new SFS image and the portion(s) of the original SFS image to which the new SFS image portion corresponds (a new portion can depend on more than one original portion, and in addition, the original portion(s) might not be in the same location as the new portion). The delta files are transferred to a device for use in updating images of the device to the new SFS image. The target SFS image of the device is updated block-by-block using information of the delta files. The block-by-block update of an embodiment reconstructs all portions of the new SFS image in a device block in random access memory (RAM) of the host device and then writes the reconstructed block into ROM of the host device.

A SFS, also referred to as a read-only file system, is a file system that can not be modified during run time. Examples of SFSs include but are not limited to the Symbian Z drive (also referred to as the "ROM drive"), the Linux compressed ROM file system (CRAMFS), the encrypted file systems, and file systems that might store operating system executables, built-in applications, essential multimedia information, and default language files, to name a few.

The SFS differencing and updating of embodiments described below receives images of a static file system. The images, which include an original image and a new image, each include a number of blocks, for example super blocks, data blocks, etc. The SFS differencing splits the images by using information of the blocks to split the images into multiple portions. Differences are determined between content of the images by determining differences between the portions of the original image and the new image, where the differences are generated for each portion of the new image. The differences include byte-level differences between the portions, but are not so limited. A delta file is generated that includes the differences for each portion of the new image.

The SFS differencing and updating of embodiments includes updating by which the SFS of an image hosted on a portable device is updated in-place on the portable device. The updating receives the delta file at a portable device via at least one coupling. Dependent ones of the original portions hosted on the portable device are assembled, and at least one of them is identified that corresponds to the delta file received, where the new portion location in ROM is encoded in the SFS delta package associated with its corresponding delta file in an embodiment. The updating reconstructs at least one new portion on the portable device that corresponds to the delta file identified. The reconstructed new portions of the new image are written to the read-only memory (ROM) of the portable device.

In the following description, numerous specific details are introduced to provide a thorough understanding of, and enabling description for, embodiments of the SFS differencing and updating. One skilled in the relevant art, however, will recognize that the SFS differencing and updating can be practiced without one or more of the specific details, or with other components, systems, etc. In other instances, well-known structures or operations are not shown, or are not described in detail, to avoid obscuring aspects of the SFS differencing and updating.

FIG. 1 is a block diagram of a SFS differencing system 100, under an embodiment. The SFS differencing system includes an image processing module 102, a dependency generation module 104, a difference engine or module 106, and a packaging engine or module 108, but is not so limited. The dependency generation module 104 of an embodiment is coupled to the image processing module 102. The difference engine 106 of an embodiment is coupled to the dependency generation module 104. The packaging engine 108 of an embodiment is coupled to the difference engine 106.

The SFS differencing system 100 of an embodiment couples among components of a host computer system (not shown), where the components can include at least one of a processor, a controller, a memory device, and/or a bus, but are not so limited. One or more of the components or modules 102-108 of the SFS differencing system 100 run under control of at least one algorithm, program, or routine. A host computer system processor couples among the components of the host computer system and the components 102-108 of the SFS differencing system 100 under program control. While the image processing module 102, dependency generation module 104, difference engine 106, and packaging engine 108 are shown as separate blocks, some or all of these blocks 102-108 can be monolithically integrated onto a single chip, distributed among a number of chips or components of a host system, and/or provided by one or some combination of programs or algorithms. The programs or algorithms when present can be implemented in software algorithm(s), firmware, hardware, and any combination of software, firmware, and hardware.

The term "module" as generally used herein refers to a logically separable part of a program, and is interchangeable with one or more terms including software, algorithm, program, component, and unit. The term "component" as generally used herein refers to one or more of the parts that make up a system; a component may be software and/or hardware and may be subdivided into other components. The terms "module", "component", and "unit" may be used interchangeably or defined to be sub-elements of one another in different ways depending on the context. The term "processor" as generally used herein refers to any logic processing unit, such as one or more central processing units (CPUs), digital signal processors (DSPs), application-specific integrated circuits (ASIC), etc.

In operation the SFS differencing system 100 receives at least one original SFS image 112 and at least one new SFS image 114 and performs portion-level differencing. The new SFS image 114 of an embodiment includes a CRAMFS image 114C but is not so limited. The CRAMFS image 114C includes a super header (SupHdr) section, a directory header (DirHdr) section, and a data section. The super header is a fixed 72-byte header that includes information like the image size, the integrity check signatures, configurations, and the root node information to name a few. The directory header is a variable section which includes the names of the directories, files, symbols, etc. The directory header section also includes the pointer/location of each file in the data section. Additionally, the directory header includes information like the hierarchy of the directories and their contents. The data section includes the data of the files/symbols that are specified in the directory header, but is not so limited.

The CRAMFS image 114C can include compressed and uncompressed files. As an example, some sections or portions of the CRAMFS image 114C can be compressed using the zlib general purpose compression library. However, other sections of the CRAMFS image 114C like the super header, directory header, and eXecute-In-Place (XIP) files may not be compressed.

The SFS differencing system 100, upon receiving the original SFS image 112 and new SFS image 114, performs portion-level differencing to generate one or more delta files as described below. The delta files are assembled into a delta package 122 for transfer to a portable or mobile device, also referred to as a client device. These differences include byte-level differences between one or more portions of blocks of the compared images, but are not so limited. The SFS differencing system 100 generates the delta file in a processor-based or computer system or running under a processor-based or computer system. The computer system on which or under which the SFS differencing system runs includes any collection of computing components and devices operating together, as is known in the art. The computer system can also be a component or subsystem within a larger computer system or network.

Contents of the delta file provide an efficient representation of the differences between the original image 112 and the new image 114. The delta file can include meta-data along with actual data of replacement and/or insertion operations that represent the differences between the new or current version of the associated file and previous versions of the file, as described in the U.S. Pat. No. 6,925,467 issued to InnoPath Software, Inc. of Sunnyvale, Calif. on Aug. 2, 2005. The SFS differencing system 100 provides any differences between the original image 112 and the new image 114 in delta files of the delta package 122 using a minimum number of bytes and a pre-defined format or protocol, thereby providing a delta file optimized in space.

Figure 2:
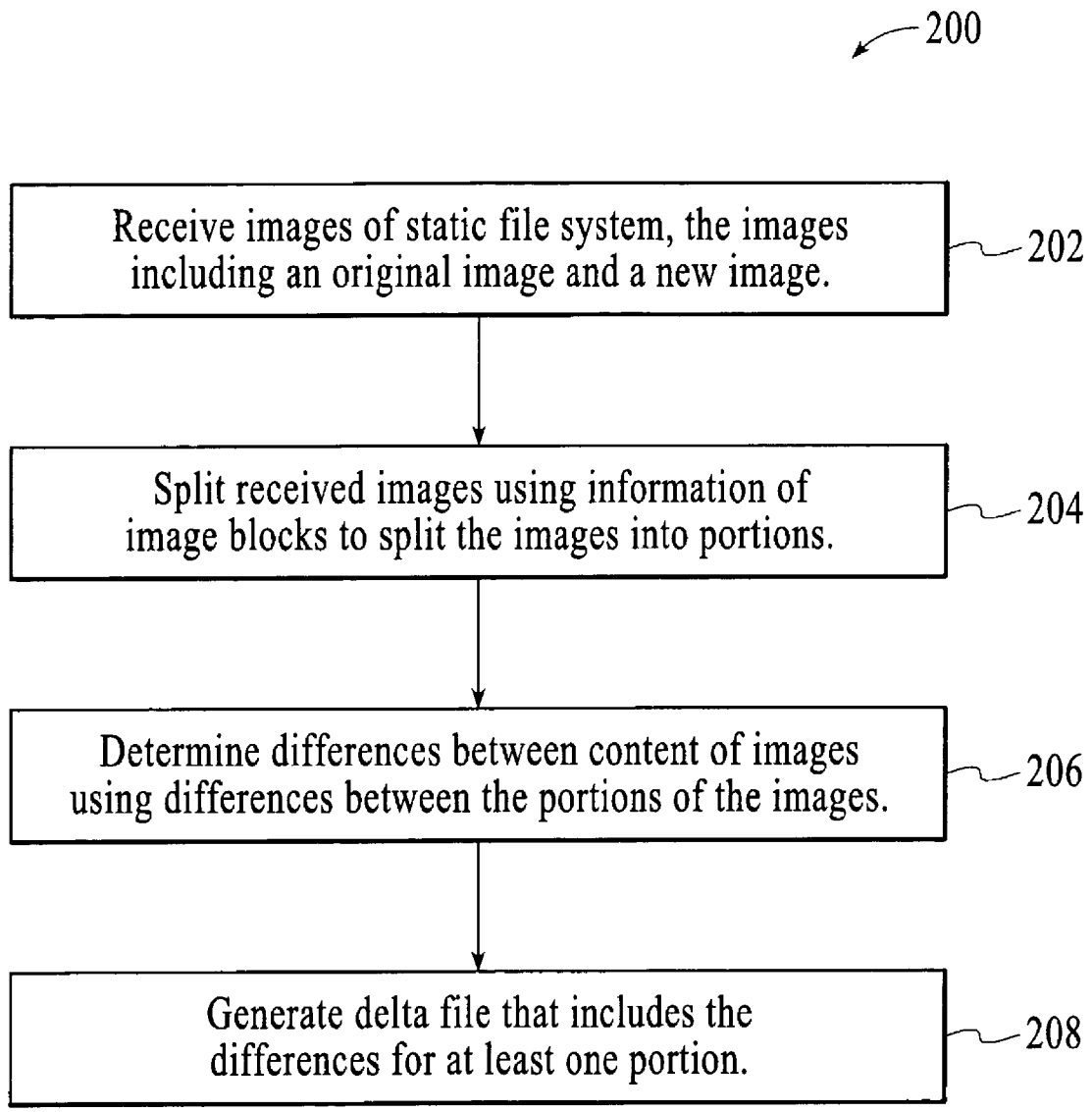
FIG. 2 is a flow diagram for SFS differencing, under an embodiment.

The SFS differencing system 100 performs portion-level differencing, and FIG. 2 is a flow diagram for SFS differencing 200, under an embodiment. The SFS differencing is performed, for example, using the SFS differencing system 100 described above and elsewhere herein. The SFS differencing 200 receives 202 images of a static file system. The images include an original image and a new image, but are not so limited. Each image also includes a number of blocks, for example the super header sections or blocks, directory blocks or sections, data blocks, etc. The blocks are of a pre-specified size (e.g., 64 KB, 128 KB, etc.) but are not so limited. The blocks of the received images are split 204 into a number of portions using information of the blocks for example. The SFS differencing 200 determines 206 differences between content of the images by determining differences between the portions of each of the original image and the new image. A delta file is generated 208 that includes information of the differences in content or data between each portion of the new image and one or more aligned portions of the original image.

Figure 3:
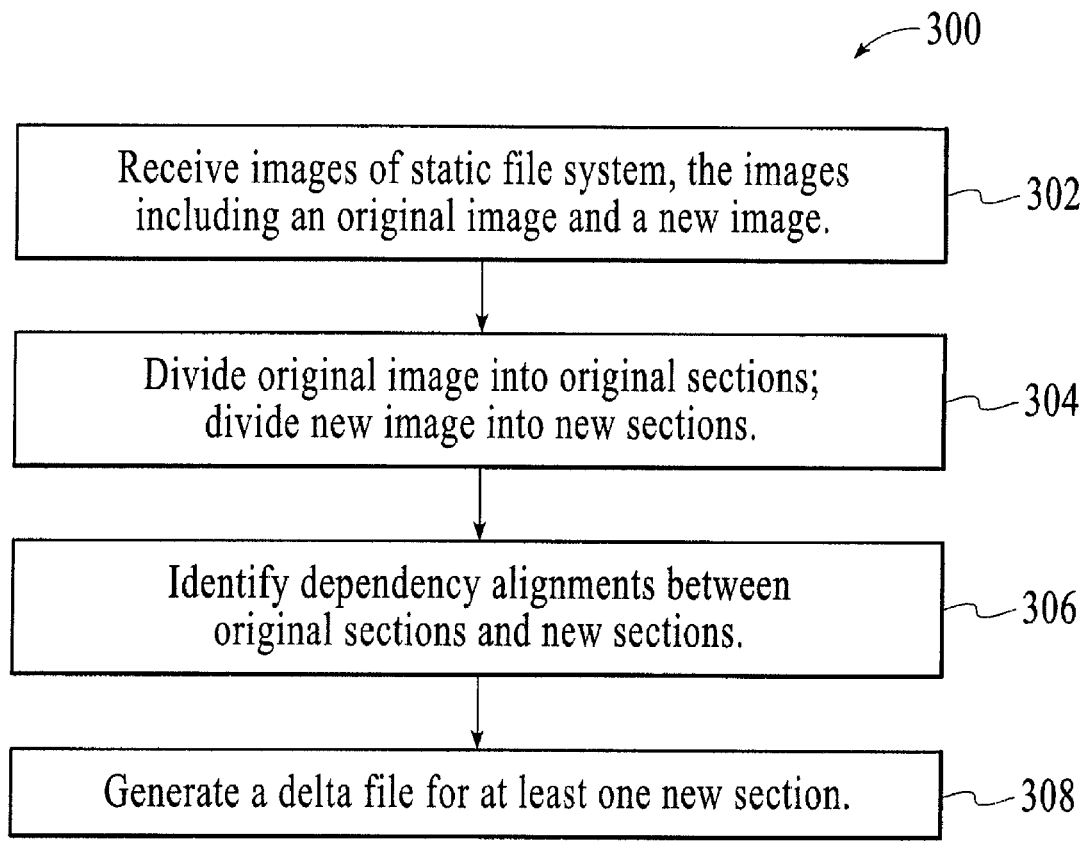
FIG. 3 is a flow diagram for SFS differencing, under another embodiment.

As another example, FIG. 3 is a flow diagram for SFS differencing 300, under an embodiment. The SFS differencing 300 receives 302 images of a static file system, as described above with reference to FIG. 2. The received original image is divided 304 into one or more original sections or portions, and the received new image is divided 304 into one or more new sections or portions. The SFS differencing identifies 306 dependency alignments between the original sections and the new sections. A delta file is generated 308 for at least one of the new sections. The delta file includes but is not limited to differences between a new section and one or more original section(s), where the new section depends on the original section(s). The delta files of alternative embodiments may include differences between at least one new section and at least one original section on which the new sections depend.

The image processing module 102, as described above with reference to FIG. 1, receives each of an original SFS image 112 and a new SFS image 114. The image processing module 102 of an embodiment operates to begin the portion-level differencing of the received images by parsing the specific image area and extracting information of the images. The information extracted about the images is used in differencing and updating operations. This parsing includes decoding the information of the static file system structure and internal format to get related information for use in performing SFS image differencing and updating. The information resulting from the parsing includes, but is not limited to, the locations and sizes of blocks of the image (e.g., super blocks, data blocks, etc.), the compression library used (if compressed), the type of encryption used to encrypt the image (e.g., encryption algorithm, encryption key, etc.) (if encrypted), to name a few.

Figure 4:
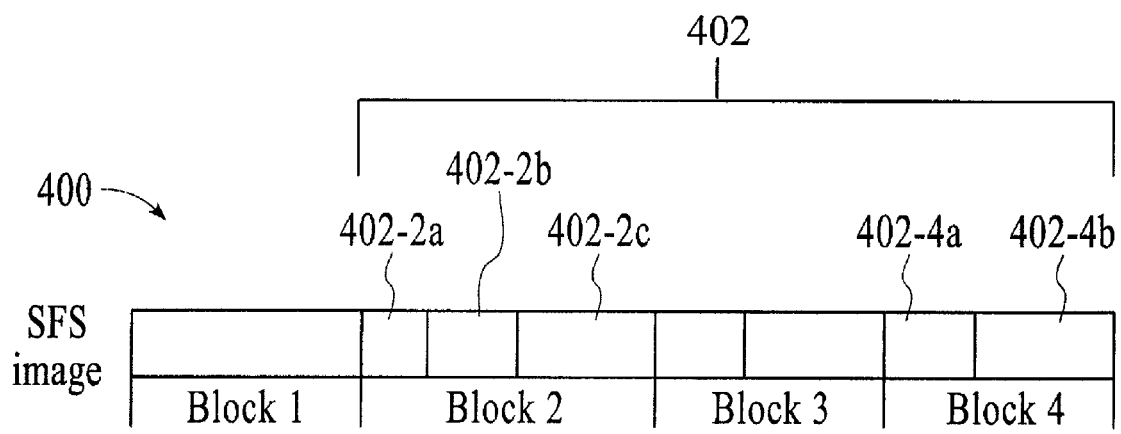
FIG. 4 is an example SFS image following splitting of the image blocks into portions, under an embodiment.

Based on the target device block information, the image processing module 102 divides or splits the SFS image into a number or series of portions. FIG. 4 is an example SFS image 400 following splitting into portions 402 by the image processing module 102, under an embodiment. The portions 402 include portions or parts of a block (e.g., "Block 4") of the image but are not so limited. For example, following splitting of an embodiment Block 2 includes portions 402-2a, 402-2b, and 402-2c, and Block 4 includes portions 402-4a and 402-4b. Following the splitting operation a block may contain any number of portions as appropriate to the data content of the block and/or the specific structure of the SFS image. The portions include for example a super block/header portion, a control meta-data portion, a file portion, etc. The SFS image processing module 102 may perform decompression (when the image is compressed), decryption (when the image is encrypted) and/or any other processing needed in order for the image processing module 102 to extract data from the received image.

The image processing module 102 of an embodiment also outputs a file which includes mapping information like the SFS image/file name and one or more locations of the SFS image/file name, for example. This file is referred to herein as a hint file but is not so limited.

When the image being updated is a CRAMFS image as described above, the image processing module 102 of an embodiment decodes the CRAMFS image and converts the image from the CRAMFS format into split files. Split files are files that include the data of a particular portion or portions of the image along with additional information of the portion(s). The additional information of the portions includes, for example, the ROM location of the portion, the block and block size of the block that includes the portion, information of the offset of the portion and/or block, size information of the portion and/or block, the uncompressed size of the portion (if the portion is compressed), and/or the header and tail bytes to name a few. The name of the split file provides all of the information of the split file, as described herein; the naming convention is described below.

In converting and splitting the CRAMFS image, the image processing module 102 copies each of the super header and directory header to the split files. Furthermore, names are assigned to these headers as defined below The symbol data sections of the CRAMFS image are special file data sections that are compressed. Therefore, the image processing module processes the symbol data section as compressed files.

The image processing module 102 converts and splits compressed files of the CRAMFS image. The compressed file sections of the CRAMFS image include a header and a series of compressed data sections but are not so limited. Each compressed portion if uncompressed is less than or equal to one page cache size (e.g., page cache size for CRAMFS image is 4096 bytes). The image processing module 102 copies the header separately from the other portions of the image. The portions of the file that fall within the same block boundary are uncompressed and concatenated and output to the split file. This is referred to as a merging technique as long as the sum of the uncompressed portions, including the start and end offset, is not more than one physical block size (e.g., RAM restriction). The portions of the image that cross block boundaries are not uncompressed but are instead cut at the boundary and output as the split files.

For one or more of the portions of the split file that were uncompressed, a compressed copy of the split file is also generated by the image processing module 102 of an embodiment. This additional split file can be provided to the difference engine 106 for use in computing the difference file and/or delta package.

The image processing module 102 of an embodiment converts and splits the execute In Place (XIP) file sections at the block boundaries and treats the XIP file sections as binary images. The XIP files are not compressed. The padding in the XIP sections is treated as a part of the current file's content. This means that the split files corresponding to an XIP file section include the real data content and also the padding bytes, but the embodiment is not so limited.

The image processing module 102 of an embodiment does not generate a data section split for special nodes. This is because the special nodes only have entries in the directory section of the CRAMFS image and thus do not have sections in the data section of the image.

Contents of a CRAMFS image may not consume the entire region reserved for the image. Therefore, the tail of a CRAMFS image can include padding bytes between the end of the data of the CRAMFS image and the end of a reserved area of the image. The image processing module 102 of an embodiment copies any padding bytes of the CRAMFS image to the split files as described below.

Split files, as described above, are files that include the data of a particular portion or portions of the image along with additional information of the portion(s). The additional information of the portions can include one or more of the ROM location of the portion, the block and block size of the block that includes the portion, information of the offset of the portion and/or block, size information of the portion and/or block, the uncompressed size of the portion (if the portion is compressed), and/or the header and tail bytes to name a few. The split file filename format of an embodiment is <Rn>_<Bn>_<Bz>_<Of>_<Sz>[_<USz>[_<Os>[_<Oe>]]].

The components of this split file filename format represent information of split file portions as follows: "<Rn>" represents ROM number, "<Bn>" represents block number, "<Bz>" represents block size, "<Of>" represents offset of the data portion (on ROM), "<Sz>" represents size of the data portion (on ROM), "<USz>" represents size of the (uncompressed data) split portion (on RAM) [optional], "<Os>" represents offset (in 4-byte units) of the start of the compressed data from the offset [optional] (range of this field is from 0 to 255 but is not limited to this range), and "<Oe>" represents offset (in bytes) of the compressed data from the end of the available data [optional] (range of this field is from 1 to 3 but is not limited to this range).

Corresponding hint information is also generated for each split generated during converting and splitting operations of the image processing module 102. This hint information is a key value pair but is not so limited. In the key value pair of an embodiment the key is the name of the split file and the value is the name of the file in the CRAMFS image with the full path. An example of the hint information is "1_2_0_65536_235 \root\bin\ls.bin.", where 1_2_0_65536_235 is the name of the split file, and \root\bin\ls.bin is the corresponding Linux file name in the CRAMFS image. The sections like the super header, the directory header and the tail data are given special values like "SUPER_HEADER", "DIR_HEADER" and "TAIL_HEADER", respectively.

The dependency generation module 104, also referred to herein as a dependency analysis module or dependency generator, determines or generates a mapping or alignment between the original images and the new images. The alignment includes information as to portions of the new image that depend on portions of the original image. The alignment of an embodiment also can include information as to the sequence by which the portions of the new image are to be updated during the in-place update of the original image hosted in the processor-based portable device. The dependency generation module 104 uses information of the specific structure of the SFS as domain knowledge (e.g., information from the hint file) in performing the alignment, and the alignment is determined relative to the block boundaries of the images, but is not so limited.

Figure 5:
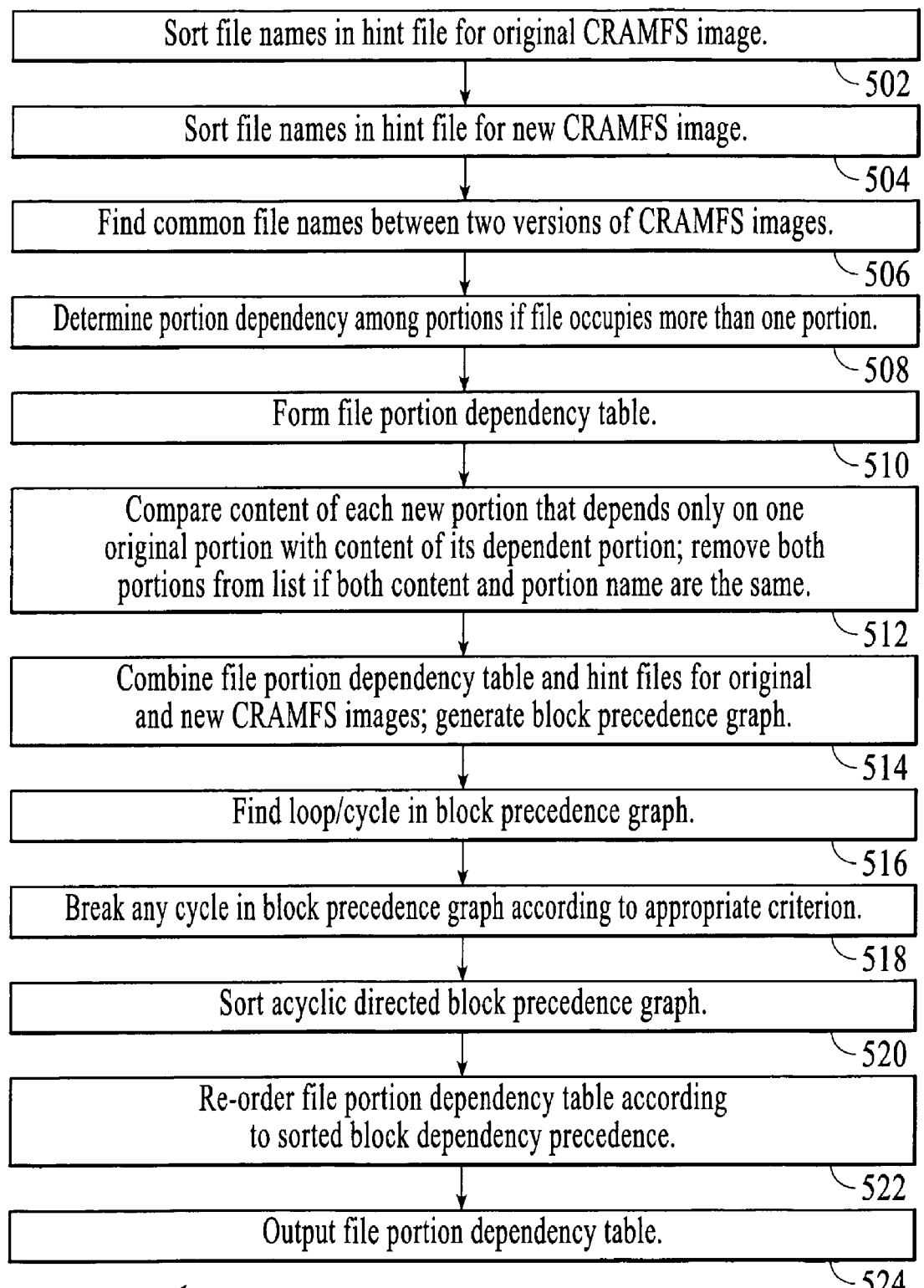
FIG. 5 is a flow diagram for dependency generation, under an embodiment.

FIG. 5 is a flow diagram for dependency generation 500, under an embodiment. The dependency generation 500, which in an embodiment is a dependency analysis algorithm or program, is used in an SFS differencing system 100 as described above with reference to FIG. 1, but can be used in other differencing systems. The dependency generation 500 of an embodiment alphabetically sorts 502 the Linux file names in the hint file of the original CRAMFS image, and alphabetically sorts 504 the Linux file names in the hint file of the new CRAMFS image. The dependency generation 500 identifies 506 or finds common Linux file names between the original and new versions of CRAMFS images.

Figure 6:
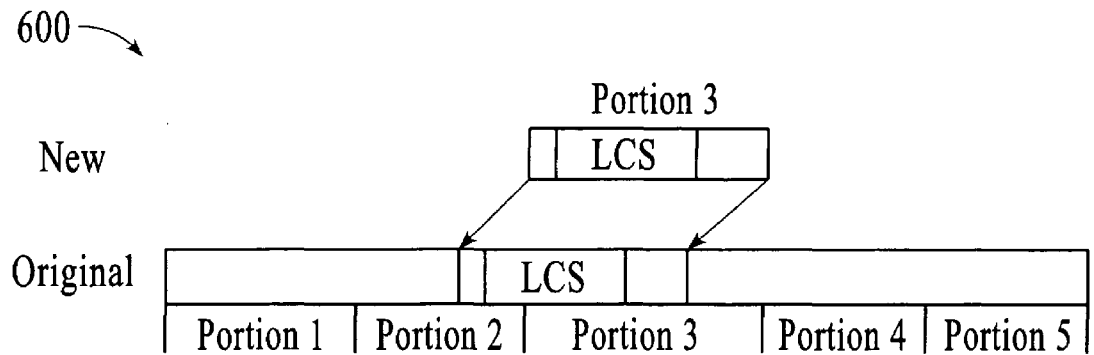
FIG. 6 is an example of portion dependency identified using dependency generation, under an embodiment.

When a Linux file occupies more than one portion, portion dependency computations or processes are used to determine 508 portion dependencies among these portions (e.g., using criterion such as longest common substring (LCS) analysis). If the portion is compressed and/or encrypted, then the portion is decompressed and/or decrypted prior to or simultaneous with computing the dependency for better matching. FIG. 6 is an example 600 of portion dependency identified using dependency generation 500, under an embodiment. In this example, Portion 3 of the new version (New) of a Linux file depends on Portion 2 and Portion 3 of the original version (Original) of the same file.

The dependency generation 500 forms 510 or generates at least one file portion dependency table. For each new portion which depends on only one original portion, the contents are compared 512 with that of its dependent original portion. If the comparison results indicate both the content and the portion name are the same, which means the content has no change and no shift, then both the new portion and the original portion are removed from the lists.

The dependency generation 500 combines 514 the file portion dependency table and the hint files for the original CRAMFS image and the new CRAMFS image, and generates the block precedence graph. Using an appropriate algorithm such as color marking, for example, loops/cycles in the block precedence graph are identified 516 or found. Any loops/cycles identified in the block precedence graph are then broken 518 according to at least one criterion such as, for example, removing the block having the minimum delta. The resulting acyclic directed block precedence graph is topologically sorted 520, and the file portion dependency table is re-ordered 522 according to the sorted block dependency precedence. The dependency generation 500 then outputs 524 the file portion dependency table, also referred to herein as the dependency table. The table of an embodiment includes two columns. The first column is for New Portion Split File Name, while the second column is for Old Portion Split File Name. An example is as follows:

| | |
|---|---|
| 1_100_65536_32768_32768 | 1_108_65536_32768_32768 |
| 1_100_65536_32768_32768 | 1_109_65536_0_65536 |
| 1_101_65536_0_65536 | 1_110_65536_0_65536 |

In the above example, the new portion of Block 100, 1_100_65536_32768_32768 depends on two old portions: 1_108_65536_32768_32768 and 1_109_65536_0_65536. The new portion 1_101_65536_0_65536 of Block 101, depends only on one portion 1_110_65536_0_65536.

The difference engine 106 generally determines or computes the portion-level differences between data of each new portion of the new image and data of the original portion of the original image. More specifically, the difference engine 106 uses information from the dependency generation module 104 to read or gather one or more portions of the old image on which each portion of the new image depends. The difference engine 106 of an embodiment computes the differences between content of the new portion and content of the original portion upon which the new portion depends. The identified differences in data between the original and new portions are encoded into a file that is referred to herein as a delta file. In addition to the encoded differences in data between original and new portions, the delta file can include control information like dependency information of dependencies between new portions and original portions. Furthermore, the delta file can include verification information (e.g., checksum values, cyclic redundancy codes (CRCs), etc.) of the delta body, the original portion of an image to be updated, and the corresponding dependency information While the difference engine 106 described above determines differences between original and new images at the portion-level, the difference engine of alternative embodiments may determine differences using a different granularity (e.g., multiple portions, etc.). Furthermore, while the difference engine 106 described above generates a delta file for each portion of a new image that is different from the portion of the original image on which it depends, alternative embodiments may generate more than one delta file for each portion or may include difference information of multiple portions in one delta file.

The packaging engine 108 receives the delta files generated by the difference engine 106 and assembles the delta files into a delta package or difference package. The packaging engine 108 of an embodiment assembles the delta files into the delta package according to an update order or sequence, but is not so limited. The packaging engine 108 can also perform additional operations on the delta file and/or delta package, for example encrypting the delta package.

Figure 7:
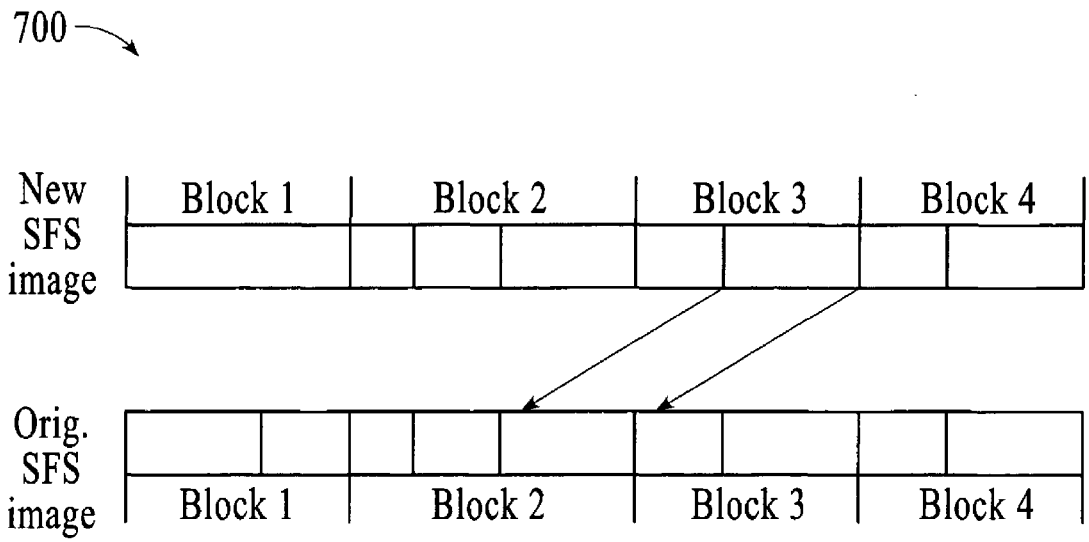
FIG. 7 is an example in which the second portion of Block 3 of a new SFS image is an exact copy of the third portion of Block 2 of the original SFS image.

During SFS image updating, it frequently occurs that a portion of an image is just moved or shifted from one location in the original version of the image to a different location in the new version of the image. Even for a one (1) byte shift, components of the updating process are still required to rewrite the entire device block to update the SFS image. FIG. 7 is an example 700 in which the second portion of Block 3 of a new SFS image is an exact copy of the third portion of Block 2 of the original SFS image. In addition, if the change(s) propagates to subsequent blocks of the image, the subsequent blocks are also required to be rewritten. The image updating of an embodiment encodes information of shifted portions by encoding shift information on where to copy and how many bytes to copy for the shifted new portion. This encoding of shift information is referred to herein as WHOLE_IS_COPY but is not so limited. Use of the WHOLE_IS_COPY reduces the size of the delta files and/or delta package and reduces the time required to perform the update.

Additionally, if the portion file name has optional fields due to the compression of the portion, the difference engine 106 using WHOLE_IS_COPY will remove these optional fields to avoid compression/decompression overhead during the CRAMFS image update. Removal of the optional fields can reduce the time to perform the update of an embodiment. For example, if Portion 2 of Block 3 in the new version is a WHOLE_IS_COPY of Portion 3 of Block 2 in the original version, the difference engine 106 of an embodiment removes the optional fields in the portion file names of Portion 2 of Block 3 in the new version and Portion 3 of Block 2 in the original version when generating the delta package.

Figure 8:
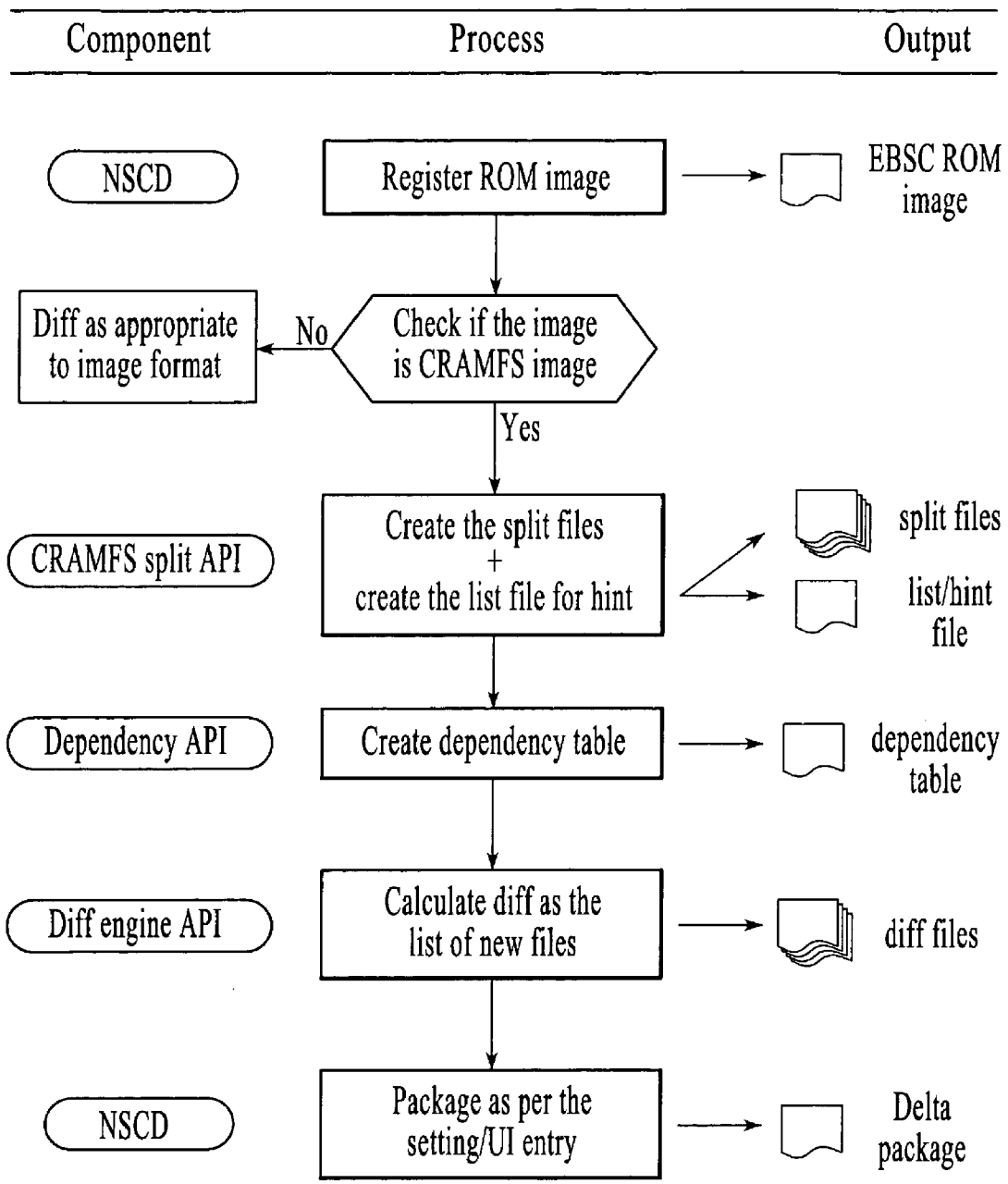
FIG. 8 shows a CRAMFS image differencing process, under an embodiment.

FIG. 8 shows a CRAMFS image differencing process 800, under an embodiment. The new image is received from a new software component distributor (NSCD), as described in U.S. patent application Ser. No. 10/146,545. The differencing process 800 determines if the received image is a CRAMFS image, and a differencing system of an embodiment (e.g., differencing system 100) is automatically called when the image registered is determined to be a CRAMFS image. If the registered image is not a CRAMFS image then the image is differenced as appropriate to the image format. The CRAMFS split application programming interface (API), which can be the image preprocessing module 102 as described with reference to differencing system 100, splits the CRAMFS image as appropriate to the software and device information and the memory restrictions of the client device that hosts the CRAMFS image. The split files and list/hint files described above result from the split but the embodiment is not so limited.

The differencing process 800 merges portions of the images to reduce the overhead of the delta package and update time. In an embodiment, merging portions of the images is done when the portions belong to the same Linux file, reside in the same physical block of the image (ROM restriction), a sum of their sizes (uncompressed) including the start and end offset is not more than one physical block size (RAM restriction), and/or the data header does not exceed a pre-specified size (e.g., number of bytes, for example (255×4) bytes), because only one byte is allocated for storing this value in an embodiment.

The dependency API, which can be the dependency generation module 104 as described with reference to differencing system 100, uses the hint file from the CRAMFS split API to determine the dependency and updating precedence information, generates a dependency table as described above. The diff engine API, which can be the difference engine 106 as described with reference to differencing system 100, generates a difference file for each new portion of the image as described above. The NSCD packages the delta files to generate a delta package, using for example the packaging engine 108 described above with reference to FIG. 1.

While the SFS differencing system 100 described above is described as including the image processing module 102, dependency generation module 104, difference engine 106, and packaging engine 108 as separate modules or components, the embodiment is not so limited. Alternative embodiments for example can include functionality of the modules 102-108 in one or more modules and/or distribute the functionality of modules 102-108 among any number of modules or system components.

The SFS differencing and updating of embodiments include updating by which SFS images hosted on a device like a portable electronic device are updated in-place on the device, as described above. The updating receives the delta file at a portable device via at least one coupling. Dependent ones of the original portions hosted on the portable device are assembled, and at least one of the dependent original sections is identified that corresponds to the delta file received. The updating reconstructs at least one new portion on the portable device that corresponds to the delta file identified. The reconstructed new portions of the new image are written to the ROM of the portable device.

Figure 9:
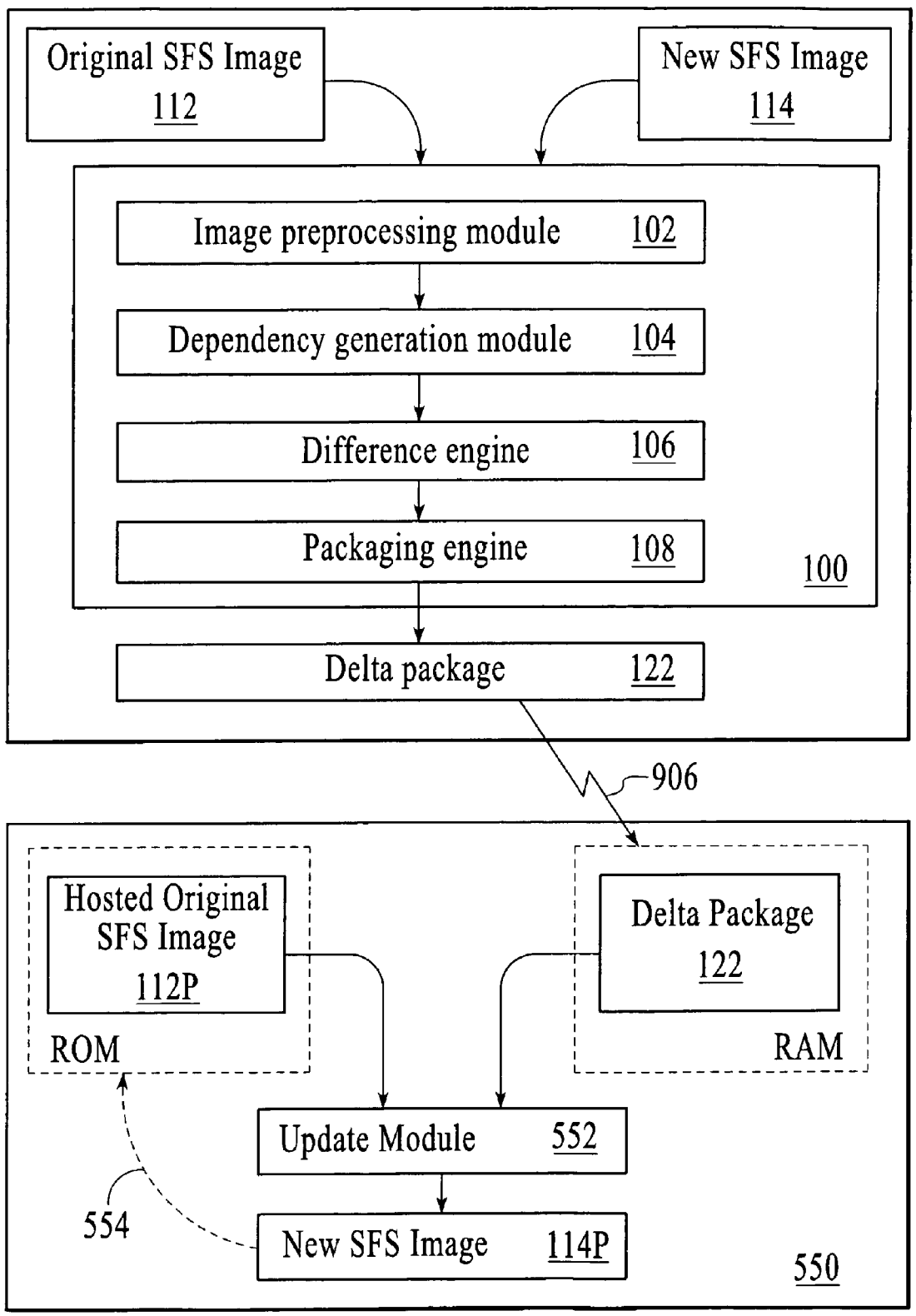
FIG. 9 is a block diagram of an SFS differencing and updating system, under an embodiment.

FIG. 9 is a block diagram of an SFS differencing and updating system 900, under an embodiment. The system 900 includes an SFS differencing system 100 and an SFS updating system 550. The SFS differencing system 100 includes an image processing module 102, a dependency generation module 104, a difference engine 106, and a packaging engine 108, as described above with reference to FIG. 1, but is not so limited. In operation the SFS differencing system 100 receives at least one original SFS image 112 and at least one new SFS image 114 and performs portion-level differencing to generate a delta package 122 that includes one or more delta files as described herein.

The SFS differencing system 100 generates the delta file in a processor-based or computer system or running under a processor-based or computer system. The computer system on which or under which the SFS differencing system 100 runs includes any collection of computing components and devices operating together, as is known in the art. The computer system can also be a component or subsystem within a larger computer system or network.

The SFS updating system 550 is hosted on a processor-based device, and receives the delta file and performs updates to original images hosed on the portable device. The processor-based device or system on which or under which the SFS updating system 550 runs includes any collection of computing components and devices operating together, as is known in the art. The computer system can also be a component or subsystem within a larger computer system or network. The processor-based device or system can include mobile devices, for example, cellular telephones, personal computers, portable computing devices, portable telephones, portable communication devices, subscriber devices or units, and personal digital assistants (PDAs). The mobile devices, also referred to as "mobile communication devices," "portable communication devices" and "communication devices," can include all such devices and equivalents, and are not limited to communication devices that are wireless.

The SFS differencing system 100 and SFS updating system 550 communicate via a communication path 906. The communication path 906 includes any medium by which files are communicated or transferred between processor-based devices or systems. Therefore, the communication path 906 includes wireless couplings or connections, wired couplings or connections, and hybrid wireless/wired couplings or connections. The communication path 906 also includes couplings or connections to and/or through networks or network components including local area networks (LANs), metropolitan area networks (MANs), wide area networks (WANs), proprietary networks, interoffice or backend networks, and the Internet. The communication path 906 can include various network components (not shown) of a communication service provider or carrier, but is not so limited. Furthermore, the communication path 906 includes removable fixed mediums like floppy disks, hard disk drives, and CD-ROM disks, as well as telephone lines, buses, and electronic mail messages.

The delta package 122 is transferred or transmitted to the SFS updating system 550 via the communication path 906. The SFS updating system 550 includes an update module 552 that uses information of the delta package 122 to perform an in-place update 554 of the SFS image 112P hosted on the portable device. The update module 552 generally reconstructs the new image 114P at the portable device by applying contents of the delta package 122 to portions of the original SFS image 112P hosted on the portable device. The reconstructed portions of the new image 114P are written to the ROM of the portable device, for example, by writing the new image 114P over the hosted original image 112P. Upon completion of this SFS update process, the SFS image now hosted on the portable device is substantially identical to the new SFS image 114 received in the first SFS differencing system 100.

Figure 10:
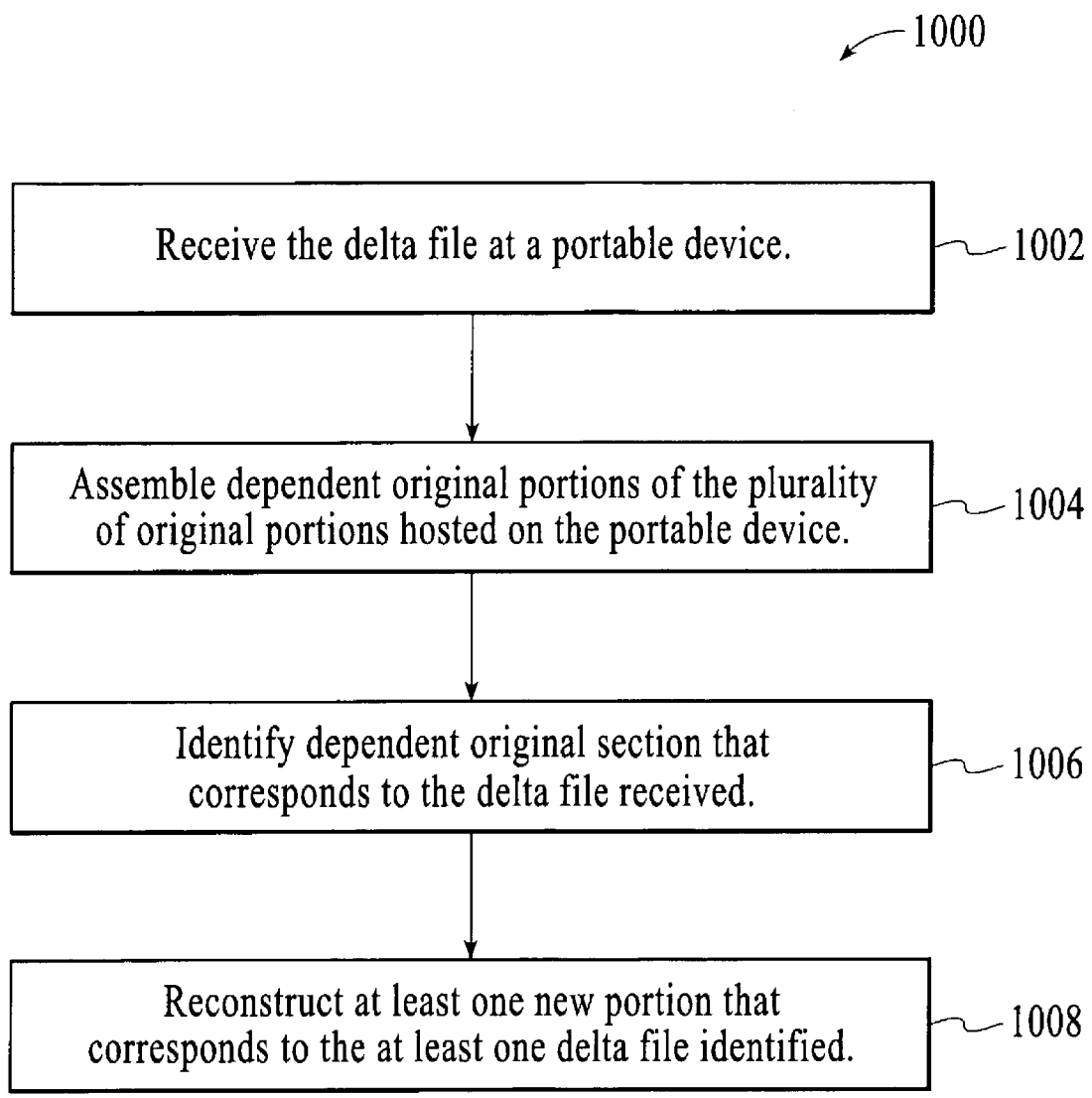
FIG. 10 is a flow diagram for SFS updating, under an embodiment.

FIG. 10 is a flow diagram for SFS updating 1000, under an embodiment. The SFS updating 1000 of an embodiment is used in resource-limited computing devices for example. The SFS updating receives 1002 the delta file at a portable device via at least one coupling. Dependent original portions of the SFS image hosted on the portable device are assembled 1004. The updating 1000 identifies 1006 at least one of the dependent original sections that correspond to the received delta file. The updating 1000 reconstructs 1008 at least one new portion on the portable device that corresponds to the delta file identified. The reconstructed new portions of the new image are subsequently written to the memory (e.g., ROM) of the portable device, for example, simultaneous with or subsequent to processing of all delta files received in a delta package.

Figure 11:
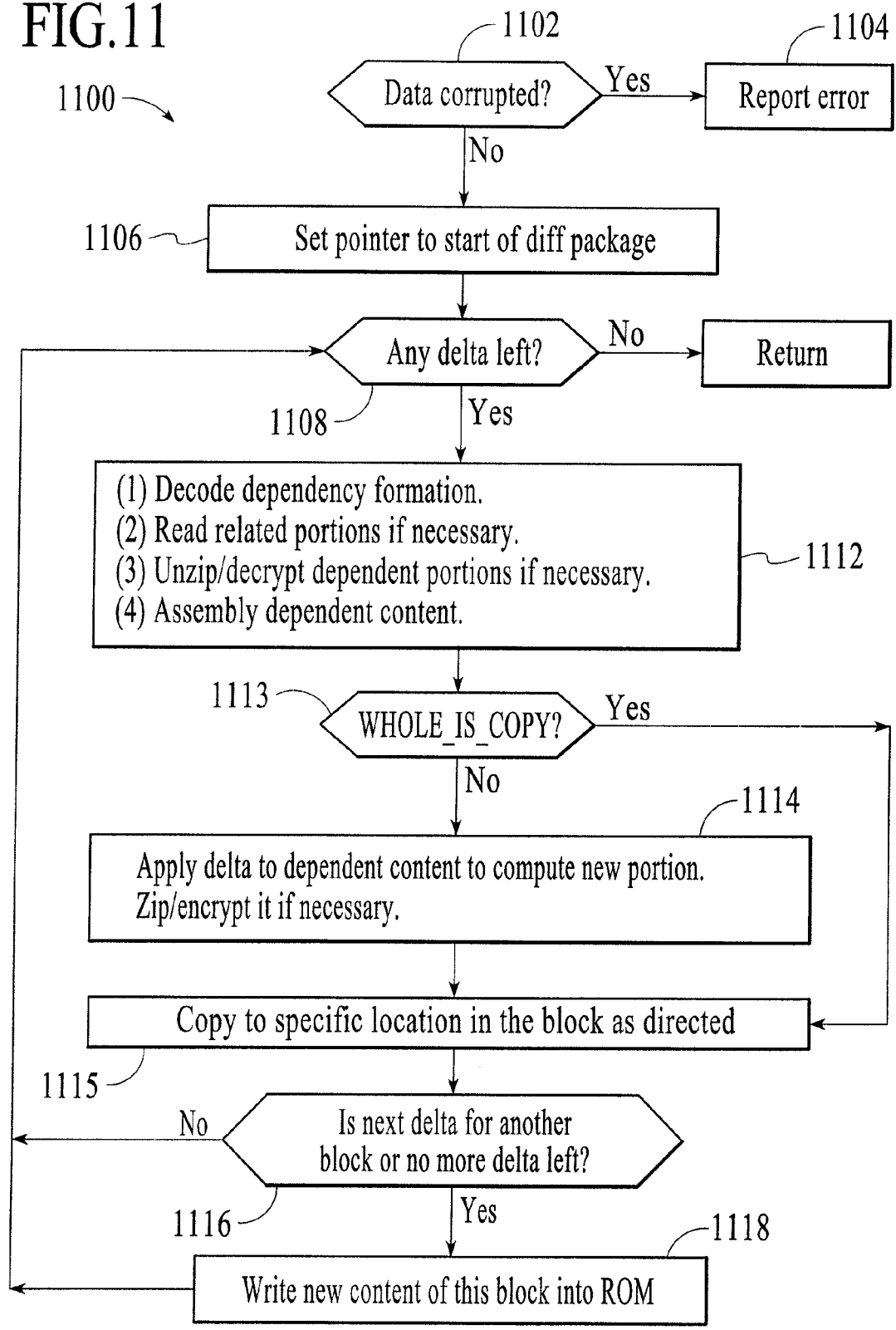
FIG. 11 is a flow diagram for in-place updating of SFS images in devices, under an embodiment.

FIG. 11 is a flow diagram for in-place updating 1100 of SFS images in devices, under an embodiment. The updating 1100 can be performed for example by an update module 552 as described above with reference to FIG. 9. The updating 1100 uses the control information encoded in the received delta package to determine 1102 that data of the delta package is not corrupt, thereby verifying the integrity of the delta package contents. The integrity of each SFS image portion to be updated can also be verified. If any data of the delta package is corrupt, the error is reported 1104.

When it is determined 1102 that the data of the delta package is not corrupt, the updating 1100 sets 1106 a pointer to the start of the delta package or diff package in order to begin the update. The portion update order and device block update order is implicitly encoded in the delta package of an embodiment. It is determined 1108 that a delta file is present at the start of the update and the update proceeds. The delta file could be encrypted for security purposes and, in that case, the delta file is decrypted (using appropriate keys) before or simultaneous with the start of the update process. The updating 1100 uses information of the delta file contents (e.g., control information) to decode 1112 dependency formation information, read 1112 related portions of the original image (if necessary), unzip and/or decrypt 1112 dependent portions of the original image (if necessary), and assemble 1112 dependent content of original portions of the original image hosted on the portable device.

The updating 1100 determines 1113 if a portion of a new image is an exact copy of a portion of an original image that is just moved or shifted from one location in the original version of the image to a different location in the new version of the image. When the updating determines 1113 that portions of the new image are exact copies of portions of an original image, the updating of an embodiment encodes information of shifted portions by encoding shift information on where to copy and how many bytes to copy for the shifted new portion. This encoding of shift information is referred to herein as WHOLE_IS_COPY as described in detail above. The encoded information of the shifted portions is used to copy 1115 the portion of the new image to a pre-specified or specific location in the block of the original image so as to replace the original portion to which it corresponds.

The updating 1100 generates or reconstructs the new portion of the image being updated by applying 1114 the contents of the delta file to the dependent content of the original portion of the original image. The new portion once reconstructed is written to an area of RAM in the host device, and is zipped and/or encrypted 1114 as appropriate to the SFS image. The new portion is placed 1115 into a specific location in the block of the original image so as to replace the original portion to which it corresponds. After each block of the new image is created or reconstructed, that particular block is written to the ROM; alternative embodiments may write the reconstructed blocks to the ROM at other points in the update process. The update process then proceeds with processing the delta file for the next block.

The updating 1112, 1113, 1114, and 1115 described above continues until the end of the delta package is reached and all delta files of the delta package have been processed. In so doing, a determination 1116 is made as to whether the delta package includes further delta files for use in updating additional portions of the original image. When the delta package includes unprocessed delta files corresponding to additional portions of the original image to be updated, operation returns to read and apply these unprocessed delta files. When it is determined 1116 that all delta files of the delta package have been processed and applied to the original image, the updating 1100 writes 1118 the new SFS image to the ROM of the portable device. The updating of an embodiment overwrites the original SFS image with the new SFS image, but alternative embodiments can write the new SFS image to one or more other areas of ROM or other device memory areas.

Referring to FIGS. 1, 2, 3, 5, 8, 9, 10, and 11, the operations of the processes are under control of at least one processor, but are not so limited. Those skilled in the relevant art can create source code, microcode, program logic arrays or otherwise implement the SFS differencing and/or SFS updating of an embodiment based on these flow diagrams and the detailed description provided herein. The algorithm or routine operating according to these flow diagrams is stored as program code in machine-readable or computer-readable memory areas or devices of a computer system (e.g., non-volatile memory) that forms part of the associated processors, in the associated memory areas, in removable media, such as disks, or hardwired or preprogrammed in chips, such as electronically erasable programmable ROM ("EEPROM") semiconductor chips, or in any combination of these components, but is not so limited.

The SFS differencing and updating of an embodiment includes a device for differencing static file system images. The device of an embodiment comprises a receiver that receives images of a static file system, the images including an original image and a new image. The device of an embodiment also comprises a pre-processor that divides the original image into numerous original sections and divides the new image into numerous new sections. The device of an embodiment comprises a dependency generator that identifies dependency alignments between the plurality of original sections and the plurality of new sections. The device of an embodiment comprises a difference engine that generates a delta file for at least one of the new sections, wherein the delta file includes differences between the at least one new sections and at least one of the original sections on which the at least one new sections depends.

The device of an embodiment further comprises a packaging engine that assembles the delta file for the at least one of the new sections according to an update sequence.

The SFS differencing and updating of an embodiment includes a method comprising splitting blocks of SFS images into portions based on block information and image structure information, wherein the SFS images include original images and new images. The method of an embodiment comprises performing portion-level differencing by generating a delta file for a new portion of the new image, wherein the delta file includes information of differences between the new portion and one of more corresponding original portions of the original image. The method of an embodiment comprises transferring the delta file to a client device. The method of an embodiment comprises updating a target SFS image of the client device using information of the delta file by reconstructing all portions of the new image in a device block in random access memory of the host device and writing the device block into read-only memory of the host device.

The SFS differencing and updating of an embodiment includes a method comprising receiving images of a static file system, the images including an original image and a new image. The method of an embodiment comprises dividing the original image into a plurality of original sections and divides the new image into a plurality of new sections. The method of an embodiment comprises identifying dependency alignments between the plurality of original sections and the plurality of new sections. The method of an embodiment comprises generating a delta file for at least one of the new sections, wherein the delta file includes differences between the at least one new sections and at least one of the original sections on which the at least one new sections depends.

The SFS differencing and updating of an embodiment includes a system comprising a receiver that receives images of a static file system, the images including an original image and a new image. The system of an embodiment comprises a pre-processor coupled to the receiver that divides the original image into a plurality of original sections and divides the new image into a plurality of new sections. The system of an embodiment comprises a dependency generator coupled to the pre-processor that identifies dependency alignments between the plurality of original sections and the plurality of new sections. The system of an embodiment comprises a difference engine coupled to the dependency generator that generates a delta file for at least one of the plurality of new sections that is different from at least one of the plurality of original sections on which the at least one new section depends, the delta file including coded differences between a new section and one or more original sections. The system of an embodiment comprises a packaging engine coupled to the difference engine that assembles the delta files into a delta package.

The system of an embodiment comprises an update engine in a portable device, wherein the portable device receives the delta package via at least one coupling, wherein the update engine assembles dependent original sections of the plurality of original sections hosted on the portable device, identifies at least one delta file of the delta package that corresponds to at least one of the dependent original sections, and reconstructs at least one new section that corresponds to the at least one delta file identified.

The update engine of an embodiment receives the delta package and verifies integrity of contents of at least one delta file of the delta package.

The update engine of an embodiment reconstructs the at least one new section in a first memory area of the portable device.

The first memory area of an embodiment is in random access memory (RAM).

The update engine of an embodiment continues identifying delta files of the delta package that correspond to at least one of the dependent original sections and reconstructing new sections that correspond to the delta files identified.

The update engine of an embodiment determines that all delta files of the delta package have been applied to the original sections hosted on the portable device and in response to the determination writes the reconstructed new sections to a second memory area of the portable device.

The update engine of an embodiment writes each block of the reconstructed new sections to a second memory area.

The second memory area of an embodiment is in read-only memory (ROM).

The SFS differencing and updating of an embodiment includes a method comprising receiving images of a static file system, the images including an original image and a new image, wherein the images include a plurality of blocks. The method of an embodiment comprises splitting the images by using information of the plurality of blocks to split the images into a plurality of portions. The method of an embodiment comprises determining differences between content of the images by determining differences between the plurality of portions of the original image and the new image. The method of an embodiment comprises generating a delta file that includes the differences for at least one portion.

The method of an embodiment comprises transferring the delta file to a portable wireless device that hosts the original image.

The method of an embodiment comprises receiving the delta file at a portable device via at least one coupling. The method of an embodiment comprises assembling dependent original portions of the plurality of original portions hosted on the portable device. The method of an embodiment comprises identifying at least one of the dependent original portions that corresponds to the delta file received. The method of an embodiment comprises reconstructing at least one new portion that corresponds to the at least one delta file identified.

The method of an embodiment comprises assembling a plurality of the delta files into a delta package.

The method of an embodiment comprises transferring the delta package to a portable wireless device that hosts the original image.

The method of an embodiment comprises receiving the delta package at the portable device via at least one coupling. The method of an embodiment comprises assembling dependent original portions of the plurality of original portions hosted on the portable device. The method of an embodiment comprises identifying at least one delta file of the delta package that corresponds to at least one of the dependent original portions. The method of an embodiment comprises reconstructing at least one new portion that corresponds to the at least one delta file identified.

The SFS differencing and updating of an embodiment includes computer readable media including executable instructions which, when executed in a processing system, determine differences between images by receiving images of a static file system, the images including an original image and a new image, wherein the images include a plurality of blocks. The media further determines differences between images by splitting the images by using information of the plurality of blocks to split the images into a plurality of portions. The media further determines differences between images by determining differences between content of the images by determining differences between the plurality of portions of the original image and the new image. The media further determines differences between images by generating a delta file that includes the differences for at least one portion.

The media further determines differences between images by transferring the delta file to a portable wireless device that hosts the original image.

The media further determines differences between images by receiving the delta file at a portable device via at least one coupling. The media further determines differences between images by assembling dependent original portions of the plurality of original portions hosted on the portable device. The media further determines differences between images by identifying at least one of the dependent original portions that corresponds to the delta file received. The media further determines differences between images by reconstructing at least one new portion that corresponds to the at least one delta file identified.

The media further determines differences between images by assembling a plurality of the delta files into a delta package.

The media of an embodiment may transfer the delta package to a portable wireless device that hosts the original image.

The media of an embodiment receives the delta package at the portable device via at least one coupling. The media of an embodiment assembles dependent original portions of the plurality of original portions hosted on the portable device. The media of an embodiment identifies at least one delta file of the delta package that corresponds to at least one of the dependent original portions. The media of an embodiment reconstructs at least one new portion that corresponds to the at least one delta file identified.

The SFS differencing and updating of an embodiment includes a device for differencing file system images. The device of an embodiment comprises a receiver that receives images of a static file system, the images including an original image and a new image. The device of an embodiment comprises a pre-processor coupled to the receiver that converts the images from a first format into a plurality of split files, wherein a split file includes data of at least one portion of the original image and the new image and at least one location parameter of the portion. The device of an embodiment comprises a dependency generator coupled to the pre-processor that generates a portion dependency table including information of a dependency between a portion of the new image and at least one portion of the original image. The device of an embodiment comprises a difference engine coupled to the dependency generator that generates a delta file for at least one portion of the new image, wherein the delta file includes differences between the at least one portion of the new image and at least one portion of the original image.

The first format of an embodiment is a compressed read-only memory file system (CRAMFS) format.

The device of an embodiment comprises a packaging engine coupled to the difference engine that assembles delta files for all portions of the new image.

The SFS differencing and updating of an embodiment includes a method comprising receiving images of a static file system, the images including an original image and a new image, wherein the images include a plurality of blocks. The method of an embodiment comprises converting the images into a plurality of split files, wherein the converting splits the images using information of the plurality of blocks to split the images into a plurality of portions, wherein the converting generates hint information of the splits. The method of an embodiment comprises determining differences between content of the images by determining differences between the plurality of portions of the original image and the new image. The method of an embodiment comprises generating a delta file that includes the differences for at least one portion.

The images received in an embodiment are in a compressed read-only memory file system (CRAMFS) format.

The method of an embodiment comprises writing data of the portions to the split files, the data including at least one of memory location of the portions, block information of a block that includes a portion, offset information of at least one of the portion and the block, and size information of at least one of the portion and the block.

The method of an embodiment comprises generating at least one hint file that includes the hint information.

The method of an embodiment comprises identifying any dependency between at least one portion of the new image and at least one portion of the original image. The method of an embodiment comprises generating a portion dependency table that includes dependency information of the identifying, wherein the portion dependency table excludes a new portion and its corresponding dependent original portion when the identifying indicates content and portion name are identical between the new portion and the corresponding original portion on which the new portion depends.

The method of an embodiment comprises identifying any identical portion of the new image that has identical content as the original image and a different portion name. The method of an embodiment comprises generating information of the identical portion that includes a location and a size of the identical portion, wherein the delta file includes the information of the identical portion.

The method of an embodiment comprises combining the portion dependency table and the hint information.

The method of an embodiment comprises generating a block precedence graph and forming an acyclic block precedence graph by breaking any cycle in the block precedence graph.

The method of an embodiment comprises generating a re-ordered portion dependency table by re-ordering the portion dependency table using information of the acyclic block precedence graph.

The method of an embodiment comprises transferring the delta file to a client device that hosts the original image. The method of an embodiment comprises updating a target image of the client device using information of the delta file by reconstructing all portions of the new image in a device block in random access memory of the host device and writing the device block into read-only memory of the host device.

The updating of an embodiment comprises assembling dependent original portions of the plurality of original portions hosted on the client device. The updating of an embodiment comprises identifying at least one of the dependent original portions that corresponds to the delta file received. The updating of an embodiment comprises reconstructing at least one new portion that corresponds to the at least one delta file identified.

The method of an embodiment comprises assembling a plurality of delta files into a delta package.

The method of an embodiment comprises transferring the delta package to a client device that hosts the original image.

The method of an embodiment comprises receiving the delta package at the client device via at least one wireless coupling. The method of an embodiment comprises assembling dependent original portions of the plurality of original portions hosted on the client device. The method of an embodiment comprises identifying at least one delta file of the delta package that corresponds to at least one of the dependent original portions. The method of an embodiment comprises reconstructing at least one new portion that corresponds to the at least one delta file identified.

The SFS differencing and updating of an embodiment includes a method comprising receiving images of a static file system, the images including an original image and a new image. The method of an embodiment comprises converting the images from a first format into a plurality of split files, wherein a split file includes data of at least one portion of the original image and the new image and at least one location parameter of the portion. The method of an embodiment comprises generating a portion dependency table including information of a dependency between a portion of the new image and at least one portion of the original image. The method of an embodiment comprises generating a delta file for at least one portion of the new image, wherein the delta file includes differences between the at least one portion of the new image and at least one portion of the original image.

The first format of an embodiment is a compressed read-only memory file system (CRAMFS) format.

The images of an embodiment include at least one of compressed files and uncompressed files.

The converting of an embodiment comprises copying at least one of super headers and directory headers to the split files. The converting of an embodiment comprises assigning a name to the at least one super header and directory header.

The converting of an embodiment comprises splitting the images using information of a plurality of blocks of the images to split the images into a plurality of portions. The converting of an embodiment comprises determining at least one portion of the plurality of portions that is within a same boundary of a block. The converting of an embodiment comprises decompressing the at least one portion that is within the same boundary and outputting the decompressed portion to the split files.

The method of an embodiment comprises merging the split files when the split files belong to the same CRAMFS Linux file (file restriction), reside in the same device block (ROM restriction), and a total size of an uncompressed version of the split files is less than a threshold (RAM restriction).

The method of an embodiment comprises writing data of the portions to the split files, the data including at least one of memory location of the portions, block information of a block that includes a portion, offset information of at least one of the portion and the block, and size information of at least one of the portion and the block.

The method of an embodiment comprises generating at least one hint file that includes hint information for each split of the split files.

Generating a portion dependency table of an embodiment comprises sorting file names of the hint file. Generating a portion dependency table of an embodiment comprises identifying common file names between the original image and the new image.

The sorting of an embodiment includes alphabetical sorting of at least one of file names of the original image and file names of the new image.

The method of an embodiment comprises determining any portion dependency among at least one portion of the original image and at least one portion of the new image.

The method of an embodiment comprises comparing content of each new portion with content of a corresponding original portion on which the new portion depends, wherein the new portion depends only on one original portion.

The method of an embodiment comprises generating a modified portion dependency table by removing the new portion and the corresponding original portion from the portion dependency table when the comparing indicates content and portion name are identical. The method of an embodiment comprises setting a flag when the comparing indicates content is identical and portion name is different, wherein the portion is an identical portion that is shifted in location in the new image, wherein the flag is a WHOLE_IS_COPY flag. The method of an embodiment comprises generating information of the identical portion that includes a location and a size of the identical portion, wherein the delta file includes the information of the identical portion.

The method of an embodiment comprises combining the modified portion dependency table and the hint file for the images. The method of an embodiment comprises generating a block precedence graph. The method of an embodiment comprises identifying any cycle in the block precedence graph. The method of an embodiment comprises breaking any cycle in the block precedence graph and forming an acyclic block precedence graph.

The method of an embodiment comprises generating a sorted acyclic block precedence graph by sorting information of the acyclic block precedence graph. The method of an embodiment comprises generating a re-ordered portion dependency table by re-ordering the modified portion dependency table using information of the sorted acyclic block precedence graph. The method of an embodiment comprises outputting the re-ordered portion dependency table.

The SFS differencing and updating of an embodiment includes a system comprising a receiver that receives images of a static file system, the images including an original image and a new image. The system of an embodiment includes a pre-processor coupled to the receiver that converts the images from a first format into a plurality of split files, wherein a split file includes data of at least one portion of the original image and the new image and at least one location parameter of the portion. The system of an embodiment includes a dependency generator coupled to the pre-processor that generates a portion dependency table including information of a dependency between a portion of the new image and at least one portion of the original image. The system of an embodiment includes a difference engine coupled to the dependency generator that generates a delta file for at least one portion of the new image, wherein the delta file includes differences between the at least one portion of the new image and at least one portion of the original image. The system of an embodiment includes a packaging engine coupled to the difference engine that assembles delta files for all portions of the new image.

The system of an embodiment includes an update engine in a portable device, wherein the portable device receives the delta package via at least one coupling, wherein the update engine assembles dependent original portions of the original image hosted on the portable device, identifies at least one delta file of the delta package that corresponds to at least one of the dependent original portions, and reconstructs at least one new portion that corresponds to the at least one delta file identified.

The update engine of an embodiment receives the delta package and verifies integrity of contents of at least one delta file of the delta package.

The update engine of an embodiment reconstructs the at least one new portion in a first memory area of the portable device.

The first memory area of an embodiment is in random access memory (RAM).

The update engine of an embodiment continues identifying delta files of the delta package that correspond to at least one of the original portions and reconstructing new portions that correspond to the delta files identified.

The update engine of an embodiment determines that all delta files of the delta package have been applied to the original portions hosted on the portable device and in response to the determination writes the reconstructed new portions to a second memory area of the portable device.

The second memory area of an embodiment is in read-only memory (ROM).

The SFS differencing and updating of an embodiment includes computer readable media including executable instructions which, when executed in a processing system, determine differences between images by receiving images of a static file system, the images including an original image and a new image, wherein the images include a plurality of blocks. The media further determines differences between images by converting the images into a plurality of split files, wherein the converting splits the images using information of the plurality of blocks to split the images into a plurality of portions, wherein the converting generates hint information of the splits. The media further determines differences between images by determining differences between content of the images by determining differences between the plurality of portions of the original image and the new image. The media further determines differences between images by generating a delta file that includes the differences for at least one portion.

The images received in an embodiment are in a compressed read-only memory file system (CRAMFS) format.

The media further determines differences between images by writing data of the portions to the split files, the data including at least one of memory location of the portions, block information of a block that includes a portion, offset information of at least one of the portion and the block, and size information of at least one of the portion and the block.

The media further determines differences between images by generating at least one hint file that includes the hint information.

The media further determines differences between images by identifying any dependency between at least one portion of the new image and at least one portion of the original image. The media further determines differences between images by generating a portion dependency table that includes dependency information of the identifying, wherein the portion dependency table excludes a new portion and its corresponding dependent original portion when the identifying indicates content and portion name are identical between the new portion and the corresponding original portion on which the new portion depends.

The media further determines differences between images by identifying any identical portion of the new image that has identical content as the original image and a different portion name. The media further determines differences between images by generating information of the identical portion that includes a location and a size of the identical portion, wherein the delta file includes the information of the identical portion.

The media further determines differences between images by transferring the delta file to a client device that hosts the original image. The media further determines differences between images by updating a target image of the client device using information of the delta file by reconstructing all portions of the new image in a device block in random access memory of the host device and writing the device block into read-only memory of the host device.

Aspects of the SFS differencing and updating described above may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the SFS differencing and updating include: microcontrollers with memory (such as electronically erasable programmable read only memory (EEPROM)), embedded microprocessors, firmware, software, etc. Furthermore, aspects of the SFS differencing and updating may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the SFS differencing and updating is not intended to be exhaustive or to limit the invention to the precise form disclosed. While specific embodiments of, and examples for, the SFS differencing and updating are described herein for illustrative purposes, various equivalent modifications are possible within the scope of the SFS differencing and updating, as those skilled in the relevant art will recognize. The teachings of the SFS differencing and updating provided herein can be applied to other processing systems and communication systems, not only for the SFS differencing and updating systems described above.

The elements and acts of the various embodiments described above can be combined to provide further embodiments. These and other changes can be made to the SFS differencing and updating in light of the above detailed description. Furthermore, aspects of the SFS differencing and updating can be modified, if necessary, to employ the systems, functions and concepts of the various patents and applications described above to provide yet further embodiments of the SFS differencing and updating.

In general, in the following claims, the terms used should not be construed to limit the SFS differencing and updating to the specific embodiments disclosed in the specification and the claims, but should be construed to include all processing systems that operate under the claims to provide file differencing and updating. Accordingly, the SFS differencing and updating is not limited by the disclosure, but instead the scope of the SFS differencing and updating is to be determined entirely by the claims.

While certain aspects of the SFS differencing and updating are presented below in certain claim forms, the inventors contemplate the various aspects of the SFS differencing and updating in any number of claim forms. For example, while only one aspect of the SFS differencing and updating is recited as embodied in computer-readable medium, other aspects may likewise be embodied in computer-readable medium. Accordingly, the inventors reserve the right to add additional claims after filing the application to pursue such additional claim forms for other aspects of the SFS differencing and updating.

What is claimed is:

1. A device including at least one processor and at least one memory for differencing file system images, comprising:
   a receiver that receives images of a static file system, the images including an original image and a new image;
   a pre-processor coupled to the receiver that converts the images from a first format into a plurality of split files that include uncompressed image portions and compressed image portions, wherein the uncompressed image portions correspond to received image portions that fall within a same block boundary, wherein the compressed image portions correspond to other received image portions that cross block boundaries, wherein a split file includes data of at least one portion of the original image and the new image and at least one location parameter of the portion;
   a dependency generator coupled to the pre-processor that generates a portion dependency table including information of a dependency between a portion of the new image and at least one portion of the original image; and
   a difference engine coupled to the dependency generator that generates a delta file for at least one portion of the new image, wherein the delta file includes differences between the at least one portion of the new image and at least one portion of the original image.

2. The device of claim 1, wherein the first format is a compressed read-only memory file system (CRAMFS) format.

3. The device of claim 1, further comprising a packaging engine coupled to the difference engine that assembles delta files for all portions of the new image.

4. The device of claim 1 the pre-processor further to write data to the at least one portion including a memory location, block information of a block that includes the at least one portion, offset information of the at least one portion and the block, and size information of the at least one portion and the block.

5. A method comprising:
   receiving images of a static file system using a processor-based device, the images including an original image and a new image, wherein the images include a plurality of blocks;
   converting the images into a plurality of split files that include uncompressed image portions and compressed image portions, wherein the uncompressed image portions correspond to received image portions that fall within a same block boundary, wherein the compressed image portions correspond to other received image portions that cross block boundaries, wherein the converting splits the images using information of the plurality of blocks to split the images into a plurality of portions, wherein the converting generates hint information of the splits;
   determining differences between content of the images by determining differences between the plurality of portions of the original image and the new image; and
   generating a delta file that includes the differences for at least one portion.

6. The method of claim 5, wherein the images received are in a compressed read-only memory file system (CRAMFS) format.

7. The method of claim 5, further comprising writing data of the portions to the split files, the data including at least one of memory location of the portions, block information of a block that includes a portion, offset information of at least one of the portion and the block, and size information of at least one of the portion and the block.

8. The method of claim 5, further comprising generating at least one hint file that includes the hint information.

9. The method of claim 8, further comprising:
   identifying any dependency between at least one portion of the new image and at least one portion of the original image; and
   generating a portion dependency table that includes dependency information of the identifying, wherein the portion dependency table excludes a new portion and its corresponding dependent original portion when the identifying indicates content and portion name are identical between the new portion and the corresponding original portion on which the new portion depends.

10. The method of claim 9, further comprising combining the portion dependency table and the hint information.

11. The method of claim 10, further comprising generating a block precedence graph and forming an acyclic block precedence graph by breaking any cycle in the block precedence graph.

12. The method of claim 11, further comprising generating a re-ordered portion dependency table by re-ordering the portion dependency table using information of the acyclic block precedence graph.

13. The method of claim 8, further comprising:
identifying any identical portion of the new image that has identical content as the original image and a different portion name; and
generating information of the identical portion that includes a location and a size of the identical portion, wherein the delta file includes the information of the identical portion.

14. The method of claim 5, further comprising:
transferring the delta file to a client device that hosts the original image; and
updating a target image of the client device using information of the delta file by reconstructing all portions of the new image in a device block in random access memory of the host device and writing the device block into read-only memory of the host device.

15. The method of claim 14, wherein updating further comprises:
assembling dependent original portions of the plurality of original portions hosted on the client device;
identifying at least one of the dependent original portions that corresponds to the delta file received; and
reconstructing at least one new portion that corresponds to the at least one delta file identified.

16. The method of claim 5, further comprising assembling a plurality of delta files into a delta package.

17. The method of claim 16, further comprising transferring the delta package to a client device that hosts the original image.

18. The method of claim 17, further comprising:
receiving the delta package at the client device via at least one wireless coupling;
assembling dependent original portions of the plurality of original portions hosted on the client device;
identifying at least one delta file of the delta package that corresponds to at least one of the dependent original portions; and
reconstructing at least one new portion that corresponds to the at least one delta file identified.

19. A method comprising:
receiving images of a static file system using a processor-based device, the images including an original image and a new image;
converting the images from a first format into a plurality of split files that include uncompressed image portions and compressed image portions, wherein the uncompressed image portions correspond to received image portions that fall within a same block boundary, wherein the compressed image portions correspond to other received image portions that cross block boundaries, wherein a split file includes data of at least one portion of the original image and the new image and at least one location parameter of the portion;
generating a portion dependency table including information of a dependency between a portion of the new image and at least one portion of the original image; and
generating a delta file for at least one portion of the new image, wherein the delta file includes differences between the at least one portion of the new image and at least one portion of the original image.

20. The method of claim 19, wherein the first format is a compressed read-only memory file system (CRAMFS) format.

21. The method of claim 19, wherein the images include at least one of compressed files and uncompressed files.

22. The method of claim 19, wherein the converting further comprises:
copying at least one of super headers and directory headers to the split files;
assigning a name to the at least one super header and directory header.

23. The method of claim 19, wherein the converting further comprises:
splitting the images using information of a plurality of blocks of the images to split the images into a plurality of portions;
determining at least one portion of the plurality of portions that is within the same boundary of a block; and
decompressing the at least one portion that is within the same boundary and outputting the decompressed portion to the split files.

24. The method of claim 23, further comprising merging the split files when the split files belong to the same CRAMFS Linux file (file restriction), reside in the same device block (ROM restriction), and a total size of an uncompressed version of the split files is less than a threshold (RAM restriction).

25. The method of claim 19, further comprising writing data of the portions to the split files, the data including at least one of memory location of the portions, block information of a block that includes a portion, offset information of at least one of the portion and the block, and size information of at least one of the portion and the block.

26. The method of claim 19, further comprising generating at least one hint file that includes hint information for each split of the split files.

27. The method of claim 26, wherein generating a portion dependency table further comprises:
sorting file names of the hint file; and
identifying common file names between the original image and the new image.

28. The method of claim 27, wherein the sorting includes alphabetical sorting of at least one of file names of the original image and file names of the new image.

29. The method of claim 27, further comprising determining any portion dependency among at least one portion of the original image and at least one portion of the new image.

30. The method of claim 29, further comprising comparing content of each new portion with content of a corresponding original portion on which the new portion depends, wherein the new portion depends only on one original portion.

31. The method of claim 30, further comprising generating a modified portion dependency table by removing the new portion and the corresponding original portion from the portion dependency table when the comparing indicates content and portion name are identical.

32. The method of claim 31, further comprising setting a flag when the comparing indicates content is identical and portion name is different, wherein the portion is an identical portion that is shifted in location in the new image, wherein the flag is a $WHOLE_{13}\ IS_{13}\ COPY$ flag.

33. The method of claim 32, further comprising generating information of the identical portion that includes a location and a size of the identical portion, wherein the delta file includes the information of the identical portion.

34. The method of claim 31, further comprising combining the modified portion dependency table and the hint file for the images.

35. The method of claim 34, further comprising:
generating a block precedence graph;
identifying any cycle in the block precedence graph; and
breaking any cycle in the block precedence graph and forming an acyclic block precedence graph.

36. The method of claim 35, further comprising:
generating a sorted acyclic block precedence graph by sorting information of the acyclic block precedence graph;
generating a re-ordered portion dependency table by re-ordering the modified portion dependency table using information of the sorted acyclic block precedence graph; and
outputting the re-ordered portion dependency table.

37. A system including at least one processor and at least one memory comprising:
a receiver that receives images of a static file system, the images including an original image and a new image;
a pre-processor coupled to the receiver that converts the images from a first format into a plurality of split files that include uncompressed image portions and compressed image portions, wherein the uncompressed image portions correspond to received image portions that fall within a same block boundary, wherein the compressed image portions correspond to other received image portions that cross block boundaries, wherein a split file includes data of at least one portion of the original image and the new image and at least one location parameter of the portion;
a dependency generator coupled to the pre-processor that generates a portion dependency table including information of a dependency between a portion of the new image and at least one portion of the original image;
a difference engine coupled to the dependency generator that generates a delta file for at least one portion of the new image, wherein the delta file includes differences between the at least one portion of the new image and at least one portion of the original image; and
a packaging engine coupled to the difference engine that assembles delta files for all portions of the new image.

38. The system of claim 37, further comprising an update engine in a portable device, wherein the portable device receives the delta package via at least one coupling, wherein the update engine assembles dependent original portions of the original image hosted on the portable device, identifies at least one delta file of the delta package that corresponds to at least one of the dependent original portions, and reconstructs at least one new portion that corresponds to the at least one delta file identified.

39. The system of claim 38, wherein the update engine receives the delta package and verifies integrity of contents of at least one delta file of the delta package.

40. The system of claim 38, wherein the update engine reconstructs the at least one new portion in a first memory area of the portable device.

41. The system of claim 40, wherein the first memory area is in random access memory (RAM).

42. The system of claim 40, wherein the update engine continues identifying delta files of the delta package that correspond to at least one of the original portions and reconstructing new portions that correspond to the delta files identified.

43. The system of claim 42, wherein the update engine determines that all delta files of the delta package have been applied to the original portions hosted on the portable device and in response to the determination writes the reconstructed new portions to a second memory area of the portable device.

44. The system of claim 43, wherein the second memory area is in read-only memory (ROM).

45. Computer readable media including executable instructions which, when executed in a processing system, determine differences between images by:
receiving images of a static file system, the images including an original image and a new image, wherein the images include a plurality of blocks;
converting the images into a plurality of split files that include uncompressed image portions and compressed image portions wherein the uncompressed image portions correspond to received image portions that fall within a same block boundary, wherein the compressed image portions correspond to other received image portions that cross block boundaries, wherein the converting splits the images using information of the plurality of blocks to split the images into a plurality of portions, wherein the converting generates hint information of the splits;
determining differences between content of the images by determining differences between the plurality of portions of the original image and the new image; and
generating a delta file that includes the differences for at least one portion.

46. The media of claim 45, wherein the images received are in a compressed read-only memory file system (CRAMFS) format.

47. The media of claim 45, wherein the media further determines differences between images by writing data of the portions to the split files, the data including at least one of memory location of the portions, block information of a block that includes a portion, offset information of at least one of the portion and the block, and size information of at least one of the portion and the block.

48. The media of claim 45, wherein the media further determines differences between images by generating at least one hint file that includes the hint information.

49. The media of claim 48, wherein the media further determines differences between images by:
identifying any dependency between at least one portion of the new image and at least one portion of the original image; and
generating a portion dependency table that includes dependency information of the identifying, wherein the portion dependency table excludes a new portion and its corresponding dependent original portion when the identifying indicates content and portion name are identical between the new portion and the corresponding original portion on which the new portion depends.

50. The media of claim 48, wherein the media further determines differences between images by:
identifying any identical portion of the new image that has identical content as the original image and a different portion name; and
generating information of the identical portion that includes a location and a size of the identical portion, wherein the delta file includes the information of the identical portion.

51. The media of claim 45, wherein the media further determines differences between images by:
transferring the delta file to a client device that hosts the original image; and
updating a target image of the client device using information of the delta file by reconstructing all portions of the new image in a device block in random access memory of the host device and writing the device block into read-only memory of the host device.

* * * * *